United States Patent
Funk

(10) Patent No.: US 11,153,376 B2
(45) Date of Patent: Oct. 19, 2021

(54) SYSTEMS AND METHODS FOR AN INTERNET OF THINGS COMPUTING SHELL

(71) Applicant: CenturyLink Intellectual Property LLC, Denver, CO (US)

(72) Inventor: Tom Funk, Littleton, CO (US)

(73) Assignee: CenturyLink Intellectual Property LLC, Broomfield, CO (US)

( * ) Notice: Subject to any disclaimer, the term of this patent is extended or adjusted under 35 U.S.C. 154(b) by 139 days.

(21) Appl. No.: 15/852,261

(22) Filed: Dec. 22, 2017

(65) Prior Publication Data

US 2018/0241813 A1  Aug. 23, 2018

Related U.S. Application Data

(60) Provisional application No. 62/462,509, filed on Feb. 23, 2017.

(51) Int. Cl.
*H04L 29/08* (2006.01)
*H04L 12/28* (2006.01)
(Continued)

(52) U.S. Cl.
CPC .......... *H04L 67/1042* (2013.01); *G06F 9/546* (2013.01); *H04L 12/281* (2013.01);
(Continued)

(58) Field of Classification Search
CPC ......... H04W 4/70; H04W 12/02; H04W 4/50; H04W 84/18; H04W 48/16;
(Continued)

(56) References Cited

U.S. PATENT DOCUMENTS

2009/0106571 A1* 4/2009 Low ............... G06F 9/4856
713/310
2013/0275574 A1* 10/2013 Hugard, IV ......... H04L 41/12
709/224
(Continued)

OTHER PUBLICATIONS

Eyal Ronen, Adi Shamir. "Extended Functionality Attacks on IoT Devices: The Case of Smart Lights." 2016 IEEE European Symposium on Security and Privacy, pp. 3-12 (Year: 2016).*
(Continued)

*Primary Examiner* — Philip J Chea
*Assistant Examiner* — Ruth Solomon

(57) ABSTRACT

Novel tools and techniques for an IoT shell are provided. A system includes a plurality of IoT resources including one or more sensors, a data lake comprising a collection of data streams from the one or more sensors, and an IoT device in communication with the plurality of IoT resources and coupled to the one or more sensors. The IoT device may configured to provide an IoT shell interfacing with a system kernel, the IoT shell configured to accept a set of one or more shell commands. The IoT device may further be configured to receive one or more shell commands, and determine at least one of an argument of the shell command, and an attribute of the argument. The IoT device may then perform a shell command of the one or more shell commands on one or more of the plurality of IoT resources.

17 Claims, 7 Drawing Sheets

(51) Int. Cl.
*G06F 9/54* (2006.01)
*H04W 4/70* (2018.01)
*G06F 9/455* (2018.01)

(52) U.S. Cl.
CPC ...... *H04L 12/2814* (2013.01); *H04L 67/1068* (2013.01); *H04L 67/2819* (2013.01); *G06F 9/45512* (2013.01); *G06F 9/547* (2013.01); *G06F 2209/547* (2013.01); *H04W 4/70* (2018.02)

(58) Field of Classification Search
CPC . H04W 12/009; H04W 76/11; H04L 67/1042; H04L 67/025; H04L 67/34; H04L 2209/805; H04L 67/125; H04L 12/2803; H04L 41/0613; H04L 41/0803; H04L 41/082; H04L 12/281; H04L 12/2814; H04L 67/1068; H04L 67/2819; H04L 67/10; G06F 8/65; G06F 2209/547; G06F 9/45512; G06F 9/546; G06F 9/547; G06F 9/05
See application file for complete search history.

(56) References Cited

U.S. PATENT DOCUMENTS

| | | | |
|---|---|---|---|
| 2014/0241373 A1* | 8/2014 | Pasam | H04L 45/306 |
| | | | 370/400 |
| 2015/0339570 A1 | 11/2015 | Scheffler | |
| 2016/0004609 A1 | 1/2016 | Knight | |
| 2016/0043926 A1* | 2/2016 | Frei | G06F 13/10 |
| | | | 709/224 |
| 2016/0295364 A1* | 10/2016 | Zakaria | H04W 4/023 |
| 2017/0006135 A1 | 1/2017 | Siebel et al. | |
| 2017/0094033 A1* | 3/2017 | Sathyadevan | H04W 4/70 |
| 2017/0169640 A1* | 6/2017 | Britt | G07C 9/00309 |
| 2017/0171204 A1* | 6/2017 | Forood | H04W 4/70 |
| 2017/0279671 A1* | 9/2017 | Christopher | H04L 67/2823 |
| 2017/0359237 A1* | 12/2017 | Hao | H04W 12/08 |
| 2018/0054375 A1* | 2/2018 | Frei | H04L 67/12 |
| 2018/0143825 A1* | 5/2018 | Noens | G06F 8/77 |
| 2018/0150341 A1* | 5/2018 | Pan | G06F 9/5027 |
| 2018/0329715 A1* | 11/2018 | Jeong | G06F 9/44 |
| 2018/0351761 A1* | 12/2018 | Li | H04L 12/281 |

OTHER PUBLICATIONS

International Search Report and Written Opinion of the International Searching Authority, PCT/US18/19197 dated May 7, 2018, 8 pages.

* cited by examiner

SYSTEMS AND METHODS FOR AN INTERNET OF THINGS COMPUTING SHELL

CROSS REFERENCE TO RELATED APPLICATIONS

This application claims priority to U.S. Provisional Patent Application Ser. No. 62/462,509 filed Feb. 23, 2017 by Tom Funk, entitled "Internet of Things (IoT) Computing Shell." The disclosures of this application are incorporated herein by reference in its entirety for all purposes

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to computing shells and interfaces, and more particularly to systems supporting computing shells adapted to an internet of things ecosystem.

BACKGROUND

Increasingly, devices found in homes and businesses are becoming interconnected. Smart, network-connected devices, such as household appliances, televisions, personal electronics, vehicles, HVAC systems, sprinkler systems, light bulbs, utility meters, and industrial equipment and telemetry devices permeate modern homes and commercial/industrial spaces. Many manufacturers and vendors provide devices that operate within their own proprietary internet of things (IoT) ecosystems. Thus, a disparate patchwork of systems, protocols, and telemetry controls have emerged, varying by manufacturer or vendor, and in some cases the same vendor may offer multiple IoT platforms.

Open-source development kits and tools for tying together the various devices, APIs, and internet or cloud-based resources have emerged. However, these tools have extensive processing and library requirements to run, such as computers and internet browsers. Accordingly, tools and techniques are provided for a light-weight, IoT-specific computing shell.

BRIEF DESCRIPTION OF THE DRAWINGS

A further understanding of the nature and advantages of the embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

Figure 1:
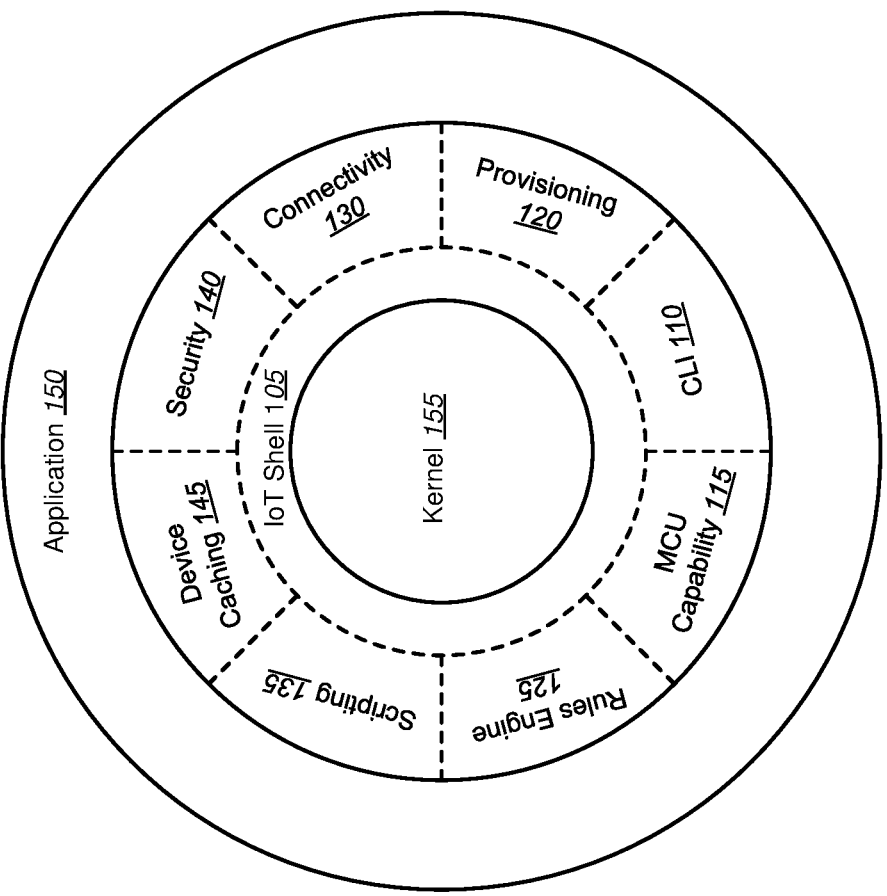
FIG. 1 is a schematic representation of an operating system architecture for an IoT computing shell, in accordance with various embodiments.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

The various embodiments include, without limitation, methods, systems, and/or software products. Merely by way of example, a method might comprise one or more procedures, any or all of which are executed by a computer system. Correspondingly, an embodiment might provide a computer system configured with instructions to perform one or more procedures in accordance with methods provided by various other embodiments. Similarly, a computer program might comprise a set of instructions that are executable by a computer system (and/or a processor therein) to perform such operations. In many cases, such software programs are encoded on physical, tangible, and/or non-transitory computer readable media (such as, to name but a few examples, optical media, magnetic media, and/or the like).

In an aspect, a system for an IoT shell is provided. The system may include a plurality of IoT resources including one or more sensors, a data lake comprising a collection of data streams from the one or more sensors, and an internet of things (IoT) device in communication with the plurality of IoT resources and coupled to the one or more sensors. The IoT device may include a processor, and a non-transitory computer readable medium. The computer readable medium may include instructions that are executable by the processor to perform various functions. For example, the instructions may cause the processor to provide an IoT shell interfacing with a system kernel, the IoT shell configured to accept a set of one or more shell commands. The instructions may allow the processor to receive, via the IoT shell, one or more shell commands, and determine, via the IoT shell, for each of the one or more shell commands, at least one of an argument of the shell command, and an attribute of the argument. The processor may further perform a shell command of the one or more shell commands, via the IoT shell, on one or more of the plurality of IoT resources, as indicated by the at least one of the argument, and attribute.

In a further aspect, an apparatus for an IoT shell is provided. The apparatus may include a processor, and a non-transitory computer readable medium comprising instructions executable by the processor. Thus, instructions may be configured to cause the processor to provide an IoT shell interfacing with a system kernel, the IoT shell configured to accept a set of one or more shell commands. Access to one or more IoT resources responsive to one or more shell commands may then be provided by the IoT shell. One or more shell commands may be received, via the IoT shell, from an application layer. For each of the one or more shell commands, at least one of an argument of the shell command, and an attribute of the argument may be determine via the IoT shell. Finally, a function specified by a shell command may be performed by the processor on one or more of the plurality of IoT resource, as indicated by the at least one of the argument, and attribute.

In a further aspect, a method of operating an IoT shell is provided. The method may include providing, at an IoT device, an IoT shell interfacing with a system kernel, the IoT shell configured to accept a set of one or more shell commands. The method may continue by providing, via the IoT shell, access to one or more IoT resources responsive to one or more shell commands. The method continues by receiving, with the IoT shell, one or more shell commands. The IoT shell may then determine, for each of the one or more shell commands, at least one of an argument of the shell command, and an attribute of the argument. The method continues by performing a shell command of the one or more shell commands, via the IoT shell, on one or more of the plurality of IoT resources, as indicated by the at least one of the argument, and attribute.

Various modifications and additions can be made to the embodiments discussed without departing from the scope of the invention. For example, while the embodiments described above refer to specific features, the scope of this invention also includes embodiments having different combination of features and embodiments that do not include all the above described features.

FIG. 1 is a schematic representation of an operating system architecture 100 of an IoT computing shell, in accordance with various embodiments. The operating system (OS) architecture 100 depicts, on a conceptual level, the various layers of the operating system. In this example, the OS architecture 100 includes an IoT computing shell 105 (hereinafter referred to interchangeably as an IoT shell), application layer 150, and kernel 155. The IoT shell 105 may further include various functionalities that may be invoked or otherwise accessed by programs and applications, for example, on the application layer 150. These functionalities may include, without limitation, a command line interpreter 110, microcontroller unit (MCU) capability 115, provisioning functionality 120, a rules engine 125, connectivity functionality 130, scripting functionality 135, security functions 140, and device caching functionality 145. It should be noted that the various layers of the OS architecture 100, and the functionalities of the IoT shell 105 are schematically illustrated in FIG. 1, and that modifications to the OS architecture 100 or functionalities of the IoT shell 105 may be possible in accordance with various embodiments.

In various embodiments, the kernel 155 may be a kernel of an operating system, in this example OS 100, as known to those of ordinary skill in the art. The kernel 155 may be the core of the OS 100, interfacing directly with the hardware of an underlying system. The kernel 155 may be configured to control access to various hardware resources. Kernels, including kernel 155, may perform various functions to allow users, at the application layer 150, to access the various system resources. Accordingly, kernels, such as kernel 155, may further be configured to perform various functions, including, without limitation, memory management, device management, process management, thread management, system call management, and scheduling. Thus, the kernel 155 interfaces directly with hardware to access hardware resources of the system.

In various embodiments, the IoT shell 105 may be a computing shell configured to interface with the kernel 155. The IoT shell 105 may be configured to take commands from a user or program on the application layer 150 to execute various functions of the kernel 155. Thus, the IoT shell 105 may be configured to make various system calls to the kernel 155, through which a user or program, application, or utility on the application layer 150 may access the functions of the kernel 155. Accordingly, in various embodiments, the IoT shell 105 may include a plurality of commands, which may be invoked by a user directly, or via a program, application, or utility at the application layer 150. The commands of the IoT shell 105 may be used to cause the IoT shell 105 to perform various functions specialized for an IoT environment. The functions of the IoT shell 105 include, without limitation, CLI 110, MCU capability 115, provisioning functionality 120, rules engine 125, connectivity functionality 130, scripting functionality 135, security functions 140, and device caching functionality 145. Accordingly, in addition to the functionality provided in conventional computing shells, the IoT shell 105 may be configured to include further specialized functions for an IoT environment.

For example, in various embodiments, the IoT shell 105 may include a CLI 110. The CLI 110 may be a command line interpreter (also referred to as a command line interface) configured to allow a user or client (e.g., program, application, or utility in the application layer 150) to issue commands to the IoT shell 105. In some embodiments, the command line interface may be configured to accept commands as text input, which may then be converted by the IoT shell 105 into kernel 155 functions. In various embodiments, the CLI 110 may be configured to package data files. For example, data packages may include various container formats to "package" and describe a collection of data. Suitable types of data packages may include, without limitation, JSON, YAML, and XML. In further embodiments, the IoT shell 105 may be configured to provide a tracing function. For example, in some embodiments, the IoT shell 105 may be configured to operate in a shell tracing mode. The shell tracing mode may cause the IoT shell 105 to print commands in the form that they are executed by the IoT shell 105. Accordingly, shell tracing may provide a tool for debugging and discovering errors in executed programs or scripts.

The IoT shell 105 may further be configured to provide MCU capability 115. In various embodiments, MCU capability 115 may refer to the ability of the IoT shell 105 to be deployed on and compatible with microcontroller units. To provide MCU capability 115, the IoT shell 105 may be configured to be lightweight. For example, the IoT shell 105 may include lightweight code and libraries configured to allow deployment on most single board computers and other MCU systems. For example, a suitable MCU system may include, without limitation, an Arduino board and any associated sensors. In this example, to support Arduino compatibility, the IoT shell 105 may be configured to support, without limitation, libraries for C, C++, the Arduino language, and other supported programming languages. Accordingly, in some embodiments, the IoT shell 105 may be configured to accept commands written in a supported programming language. In some examples, this may include translation of the commands written in the supported programming language to a respective set of one or more shell commands.

The IoT shell 105 may further be configured to provide provisioning functionality 120. In various embodiments, the IoT shell 105 may be configured to provision various IoT devices, sensors, resources, or services with one or more pre-defined profiles. In some embodiments, the one or more pre-defined profiles may be associated with a respective context for deployment, such as a specific application for a device. The IoT shell 105 may further be configured to perform firmware validation. In some examples, the IoT shell 105 may be configured to obtain information regarding the firmware from underlying hardware. Firmware information may include, without limitation, version information, vendor information, release date, manufacturing date, and other device specific information. In some embodiments, firmware validation may be performed, via the IoT shell 105, by issuing commands to the IoT shell 105. In some further embodiments, the IoT shell 105 may be configured to support or refer to a cloud-based shell. In some examples, the IoT shell 105 may itself be a cloud-based shell. For example, a cloud-based shell may be a computing shell hosted by a provider on a cloud platform, and accessible over a communications network, such as the internet. In various embodiments, cloud-based shell may be configured to provide command-line access to cloud-based resources. For example, the cloud-based shell may be configured to provide command line access to one or more virtual machine instances of a cloud platform.

In various embodiments, the IoT shell 105 may include rules engine 125 functionality. The rules engine 125 may include, without limitation, rules and logic for data collection and analytics, heuristics, and business processes. In various embodiments, the rules engine 125 may include contextual edge logic. For example, a rules engine 125 may be configured to implement, deploy, or otherwise apply context specific rules, heuristics, and logic at respective IoT edge devices. For example, contexts may be specific to, without limitation, a user or customer, a network, application, or platform. By implementing context specific rules, heuristics, and logic at an IoT edge device associated with a specific context, the rules engine 125 may enable the IoT edge device to perform data analytics and other processes for the specific context associated with the IoT edge device. In further embodiments, the IoT shell 105 may be configured to implement, in the rules engine 125, an artificial intelligence (AI) or other machine learning algorithms. For example, in some embodiments, the rules engine 125 may be configured to apply one or more machine learning algorithms to perform data analytics, data mining, or other processes. In some examples, the machine learning algorithm may be configured to generate predictive models, detect errors, perform remedial actions, among other functions, based on data collected by the IoT device. Thus, the rules engine 125 may include one or more machine learning algorithms in its data handling and processing. In various embodiments, the machine learning algorithms of the rules engine 125 may be context specific. For example, in some embodiments, the rules engine 125 may be specific to specific applications and deployments. For example, in the case of a thermostat, the rules engine 125 may include machine learning algorithms for learning usage patterns and temperature settings, and may further include rules for accessing external resources, such as outdoor temperature. Accordingly, the IoT shell 105 may be configured to support these functions, for example, through shell commands. In further embodiments, the IoT shell 105 may be configured to handle anomaly detection via the rules engine 125. In some examples, anomaly detection may include an ability of the rules engine 125 to detect whether an anomaly has occurred. In some embodiments, the IoT shell 105 may be configured to determine whether an anomaly has occurred at one or more specific IoT devices, or whether an anomaly occurred related to data obtained from one or more sensors associated with respective IoT devices. In yet further embodiments, the IoT shell 105 may be configured to provide fog capability via the rules engine 125. The fog, in contrast with the cloud, refers to an ability of the rules engine 125 and associated processes of the rules engine 125, such as data analytics, heuristics, business processes, and anomaly detection, to be performed in a distributed manner via one or more IoT user devices or IoT edge devices.

In various embodiments, the IoT shell 105 may be configured to provide connectivity functionality 130. Connectivity functionality 130 may include, without limitation, devices, drivers, protocols, and standards for establishing connectivity and communication between one or more IoT devices. For example, the IoT shell 105 may be configured to support various types of IoT protocols, including, without limitation, protocols for handling communications, data (e.g., messaging), device discovery and management, and security. For example, in various embodiments, the IoT shell 105 may be configured to support one or more communications protocols compatible across a plurality of IoT devices. For example, communication protocols may include, without limitation, message queue telemetry transport (MQTT), constrained application protocol (CoAP), advanced message queueing protocol (AMQP), streaming text oriented messaging protocol (STOMP), data distribution service (DDS), supervisory control and data acquisition (SCADA), extensible messaging and presence protocol (XMPP), custom middleware agents, Modbus, building automation and control networks (BACnet), national transportation communications for intelligent transportation system protocol (NTCIP) 1213, Bluetooth, and Zigbee/Z-wave. Moreover, the IoT shell 105 may be configured to support various network protocols and standards utilized by various IoT devices. Correspondingly, the IoT shell 105 may be configured to support the various machine to machine (M2M) networks and radios. For example, the IoT devices may include machine to machine (M2M) radios utilizing different network protocols, for direct, always-on wireless communications between IoT devices. Thus, the IoT shell 105 may be configured to support network standards and protocols, including, without limitation, various types of low-power wide area network (LPWAN) protocols, such as long range wide area network (LoRaWAN), narrowband IoT (NB-IoT); long term evolution (LTE); Neul; Sigfox; Ingenu; IPv6 over low-power wireless personal area network (6LoWPAN); Wi-Fi; cellular communications (e.g., 2G, 3G, 4G, 5G & LTE); Thread; near field communications (NFC); radio frequency identification (RFID); and other network standards and protocols.

In various embodiments, the IoT shell 105 may be configured to provide scripting functionality 135. For example, scripting functionality 135 may refer to the ability of the IoT shell 105 to run shell scripts, and in some examples, scripts in general. Scripts are programs configured to be run by the IoT shell 105, and in some examples, may include one or more shell commands. In some embodiments, some scripts may include a series of shell commands configured to be interpreted directly by the IoT shell 105. Other scripts may be written in a separate shell language or general programming language. Accordingly, the IoT shell 105 may be configured to support various types of languages for scripting, including, without limitation, Perl, Python, Bourne Again Shell (BASH) or other BASH-like shell language, or a crontab file.

In various embodiments, the IoT shell 105 may be configured to support and provide access to various security functions 140. Accordingly, the IoT shell 105 may be configured to support various security protocols for privacy, discovery, and authentication, among other security functions 140. In some embodiments, the IoT shell 105 may be configured to support an attribute-based encryption and authentication framework, wherein communication with an associated IoT device, one or more sensors, or other IoT resources may be restricted by the attribute-based encryption and authentication framework. For example, in some embodiments, shell commands and requests received from various IoT devices or connected IoT resources may be authenticated based on the attribute-based encryption and authentication framework. The IoT shell 105 may further support identity-based encryption and authentication, such as mutual transport layer security (MTLS) certificate exchange. The IoT shell 105 may further be configured to support virtual private network (VPN) capability for communication and access to various IoT devices and resources.

In various embodiments, the IoT shell 105 may further be configured to provide device caching functionality 145. The IoT shell 105 may be configured to manage one or more IoT devices and associated sensors. For example, the IoT shell 105 may be configured to map the one or more IoT devices, and any associated data, to a single address space, utilizing various schemes. For example, the IoT shell 105 may be configured to implement a caching mechanism in which storage on each respective IoT device of the one or more IoT devices is combined as a single memory space. In other embodiments, other caching schemes may be utilized, such as the caching of address translation tables for respective storage devices of the one or more IoT devices, or utilizing an M2M relay scheme for data. The IoT shell 105 may further be configured to support offline data storage. Accordingly, the IoT shell 105 may be configured to cache device data from each of the one or more IoT devices such that it is accessible offline or locally. In further embodiments, the IoT shell 105 may be configured to batch process data from one or more sensors of the one or more IoT devices. Accordingly, the IoT shell 105 may support processing of data from multiple sensors across multiple IoT devices.

Accordingly, the IoT shell 105 may be configured to be a lightweight, easily deployable solution across an IoT platform. The IoT shell 105 may be configured to allow plug-and-play sensor and peer capabilities through the various functions described above. The IoT shell 105 may further be configured provide a secure foundation that cannot be exploited through existing tools. For example, security functionalities 140 for the IoT environment may be provided by the IoT shell 105. Accordingly, the IoT shell 105 may be configured to create a standardized ecosystem, defining, or in some cases compliant with, governmental and/or ecosystem-wide security standards. In some embodiments, source data from one or more sensors of one or more IoT devices may be easier to acquire, through functions such as device caching functionality 145. In yet further embodiments, the IoT shell 105 may be configured to comply with the IoT-A domain and information model.

Figure 2:
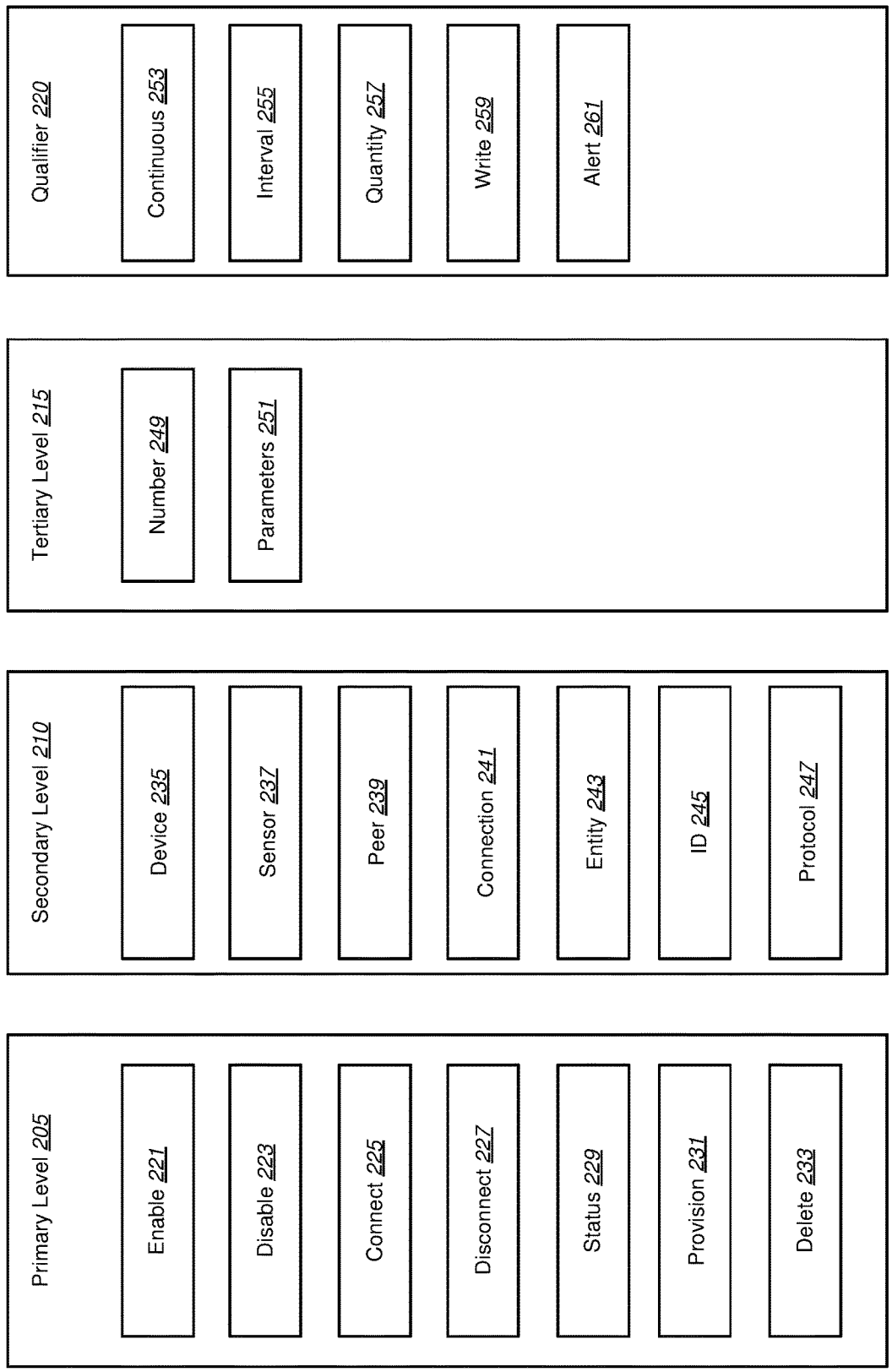
FIG. 2 is a schematic diagram of a command map for an IoT computing shell, in accordance with various embodiments.

FIG. 2 is a schematic diagram of a command map 200 for an IoT computing shell, in accordance with various embodiments. The command map 200 includes a primary level 205, secondary level 210, tertiary level 215, and qualifier 220. The primary level 205 includes a plurality of commands (e.g., shell commands). Shell commands may include an enable command 221, disable command 223, connect command 225, disconnect command 227, status command 229, provision command 231, and delete command 233. The secondary level 210 may include a plurality of arguments to the commands. The arguments may include a device 235, sensor 237, peer 239, connection 241, entity 243, identifier (ID) 245, and protocol 247. The tertiary level 215 may include a plurality of attributes of the arguments. Attributes may include a number 249, or identify a parameter 251 of the argument. The qualifier 220 may include various qualifiers to the commands, including continuous 253, interval 255, quantity 257, write 259, and alert 261. It should be noted that the various levels, commands, arguments, attributes, and qualifiers of the command map 200 are schematically illustrated in FIG. 2, and that modifications to the command map 200 may be possible in accordance with various embodiments.

In various embodiments, to invoke a shell command of the primary level 205, an argument from the secondary level 210, attribute from the tertiary level 215, and a qualifier 220 may be provided. Thus, in some examples, the syntax for executing a shell command may include an input from each of the primary level 205, secondary level 210, tertiary level 215, and a qualifier. For example, in a CLI, a user or program may issue a command by inputting a command, followed by an argument for the command, followed by an attribute of the argument, followed by a qualifier for the command. In some embodiments, one or more of the commands of the primary level 205 may accept one or more of the arguments of the secondary level 210. For example, in some cases, a command may accept all arguments of the secondary level 210, while a different command may accept a single argument, or a subset of arguments of the secondary level 210. Similarly, in some embodiments, one or more of the arguments 210 may accept one or more attributes of the tertiary level 215, and one or more commands of the primary level 205 may accept one or more qualifiers 220. In some embodiments, some commands and arguments may optionally use, or in some examples altogether not accept, attributes of the tertiary level 215, qualifiers 220, or both attributes and qualifiers 220. In yet further embodiments, the command map 200 may include further levels of attributes (not depicted), in which an attribute may be an attribute of the tertiary level 215.

In various embodiments, the primary level 205 may include various shell commands adapted to an IoT environment, which may be interpreted by the IoT shell in addition to a plurality of mandatory and optional shell commands as known to those in the art. For example, the enable command 221 may be configured to enable various IoT resources, including without limitation IoT devices, sensors, services, and their respective connections. Accordingly, the enable command 221 may take one or more arguments of the secondary level 210 specifying what to enable. Similarly, the disable command 223 may be configured to disable, without limitation, various IoT resources. Accordingly, the disable command 223 may take one or more arguments of the secondary level 210. The connect command 225 may be configured to connect an IoT device running the IoT shell to connect to another IoT resource as specified by one or more arguments of the secondary level 210. The disconnect command 227 may be configured to disconnect the IoT device running the IoT shell from another IoT resource as indicated by the one or more arguments of the secondary level. The status command 229 may be configured to obtain the status of various IoT resources, or connections, as indicated by the one or more arguments of the secondary level. A provision command 231 may be configured to provision an IoT resource, as indicated by the one or more arguments of the secondary level. The delete command 233 may be configured to delete a previously provisioned IoT resource, as indicated by the one or more arguments of the secondary level.

In various embodiments, the secondary level 210 may include various arguments to the commands adapted to an IoT environment. For example, a device 235 argument may indicate a specific IoT device for which a respective shell command from the primary level 205 may be performed. In further embodiments, the device 235 argument may specify a type of IoT device. Similarly, a sensor 237 argument may indicate a specific sensor, associated with an IoT device, for which a shell command may be performed. In some embodiments, the sensor, indicated by the sensor 237 argument, may be associated with a different IoT device than the IoT device running the IoT shell on which the shell command was issued. In further embodiments, the sensor 237 may indicate a type of sensor. A peer 239 argument may indicate a peer, or type of peer, on which to perform the shell command. A peer device may include any device to which an IoT device, running the IoT shell on which the shell command is issued, is connected and shares resources or data. Thus, the peer device may be a device with which the IoT device shares a peering relationship. The connection 241 argument may indicate a specific connection, or type of connection, on which to perform the shell command. In some embodiments, the connection specified by connection 241 may include a connection to and from the IoT device running the IoT shell on which the shell command is issued. The connection may include, without limitation, connections to other IoT resources. In other embodiments, the connection 241 may indicate a connection between IoT resources other than the IoT device on which the shell command is issued. An entity 243 argument may indicate an entity on which a shell command may be performed. In some embodiments, the entity 243 may refer to anything about which data may be stored. Accordingly, by issuing a shell command on an entity 243, the shell command may be performed on an entity 243 or data associated with the entity 243. The ID 145 argument may indicate an identifier upon which a shell command may be performed. The ID 245 may uniquely identify an IoT resource or a set of a IoT resources. In some embodiments, the ID 245 may include, without limitation, a string of alphanumeric characters. The protocol 247 argument may indicate a type of protocol used by an IoT resource. Accordingly, the shell command may be performed on IoT resources utilizing the protocol 247 indicated. As previously described, in some embodiments, each shell command may be configured to accept a respective subset of one or more arguments. Thus, a subset of one or more arguments may be passed to a given shell command.

In various embodiments, the tertiary level 215 may include various attributes of the arguments of the secondary level 210. For example, one attribute may be a number 249. The number 249 may specify a number assigned to a specific argument or type of argument. For example, a device 235 argument may specify a type of device. Thus, the number 249 attribute may specify a number assigned to a device of the device type specified by the device 235 argument. Although the device 235 argument is used as an example, it is to be understood that the number 249 attribute may similarly be applied to the other arguments of the secondary level 210. Thus, in some embodiments, the number 249 may specify a number or a numbered argument upon which the shell command may be performed. Similarly, the parameters 251 attribute may specify specific parameters of an argument upon which the shell command may be performed. For example, the device identified by the device 235 argument may include one or more parameters including, without limitation, a device's functions. Similarly, the parameter 251 attribute may apply to one or more of the arguments of the secondary level 210. As previously described, in some embodiments, each argument may be configured to accept a respective subset of one or more attributes. Thus, a subset of one or more attributes may be passed to a given shell command with an argument.

In various embodiments, the qualifier 220 includes various qualifiers, which may be passed to the shell commands of the primary level 205, configured to modify a behavior of a shell command. The continuous 253 qualifier may indicate that a shell command should be executed continuously on an argument, and in some embodiments, the attribute of the argument. The interval 255 qualifier may indicate an interval over which a shell command should be executed on an argument, and in some embodiments, the attribute of the argument. For example, in some embodiments, the interval 255 may indicate an interval of time, such as a scheduled window of time, or a schedule for the periodic execution of a shell command. The quantity 257 qualifier may indicate a quantity for a shell command. In some embodiments, the quantity 257 may indicate a number of times to execute a shell command. The write 259 qualifier may indicate a "write" property of an argument and/or attribute of the argument. In one example, an enable 221 command may be issued for a parameter 251 of a device 235 with the write 259 qualifier. Thus, in this example, the shell command, enable 221, with the write 259 qualifier may enable a parameter 251 of the device 235 may be written or overwritten. Although the write 259 qualifier is described with respect to the enable 221 command, it is to be understood that in other examples, the write 259 qualifier may be applied to other shell commands. The alert 261 qualifier may modify a shell command regarding an alert. Using the previous example, an enable 221 command may be issued for a parameter 251 of a device 235 with the alert qualifier. In this example, the shell command, enable 221, with the alert 261 qualifier may cause an alert to be enabled when a parameter 251 of the device 235 changes, exceeds or falls below a threshold, or other conditions for the alert 261 may be specified. As previously described, the alert 261 qualifier may similarly be applied to other shell commands. As previously described, in some embodiments, each shell command may be configured to accept a respective subset of one or more qualifiers. Thus, a subset of one or more qualifiers may be passed to a given shell command.

Figure 3:
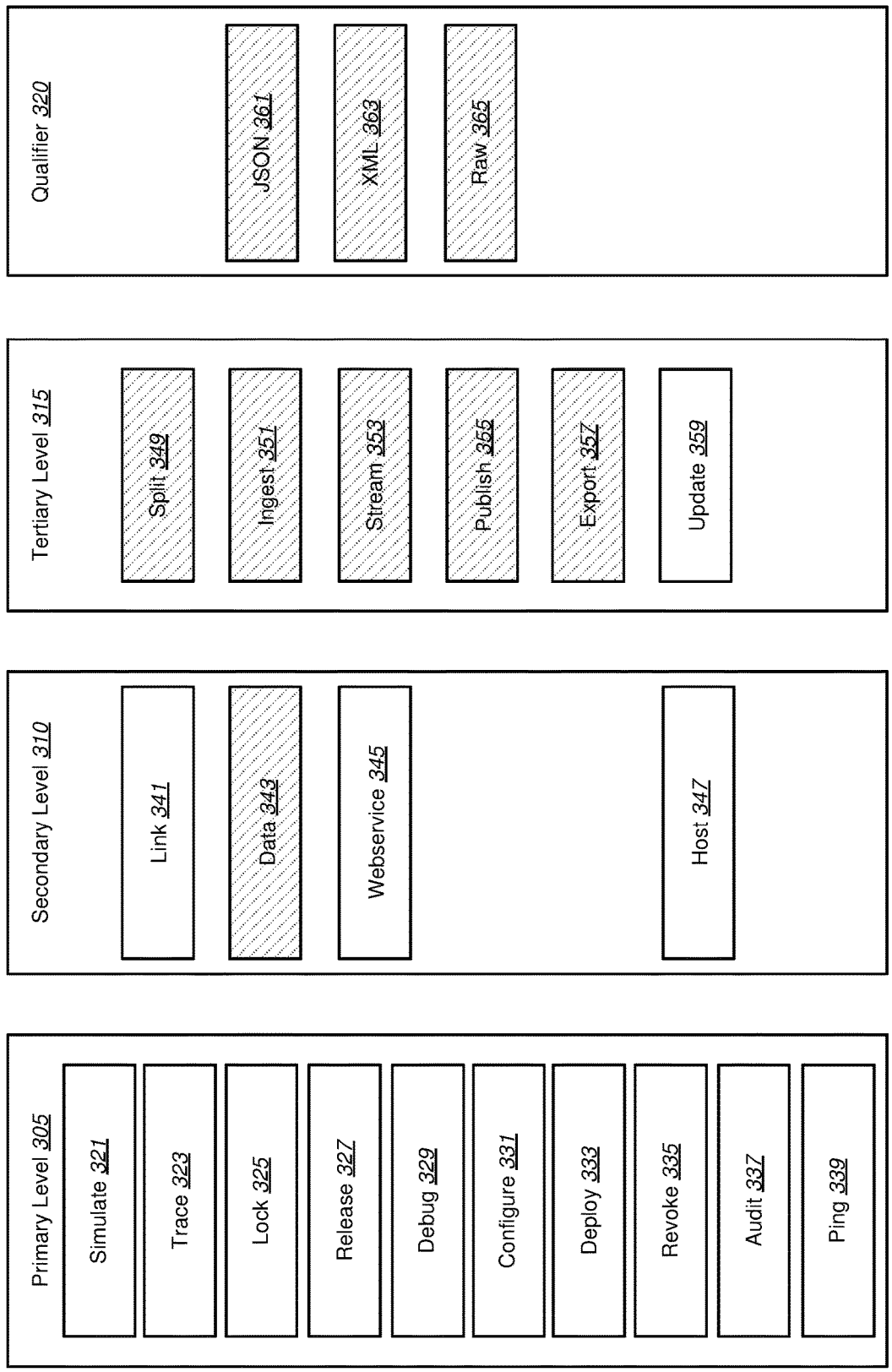
FIG. 3 is a schematic diagram of an expanded command map for an IoT computing shell, in accordance with various embodiments.

FIG. 3 is a schematic diagram of an expanded command map 300 for an IoT computing shell, in accordance with various embodiments. The expanded command map 300, like the command map 200 of FIG. 2, includes a primary level 305, secondary level 310, tertiary level 315, and qualifier 320. The primary level 305 includes a plurality of commands (e.g., shell commands). The shell commands may include a simulate command 321, trace command 323, lock command 325, release command 327, debug command 329, configure command 331, deploy command 333, revoke command 335, audit command 337, and ping command 339. The secondary level 310 may include a plurality of arguments to the commands. The arguments may include a link 341, data 343, webservice 345, and host 347. The tertiary level 315 may include a plurality of attributes of the arguments. Attributes may include split 349, ingest 351, stream 353, publish 355, export 357, and update 359. The qualifier 320 may include various qualifiers to the commands, including JSON 361, XML 363, and raw 365. It should be noted that the various levels, commands, arguments, attributes, and qualifiers of the expanded command map 300 are schematically illustrated in FIG. 3, and that modifications to the expanded command map 300 may be possible in accordance with various embodiments.

As previously described with respect to FIG. 2, in various embodiments, to invoke a shell command of the primary level 305, an argument from the secondary level 310, attribute from the tertiary level 315, and a qualifier 320 may be provided. Each of the commands in the command maps 200, 300 of FIGS. 2 & 3 may be configured to be interpreted by IoT shell running on an IoT device, and may be executed by one or more processors of the IoT device, causing the IoT device and/or the IoT shell to perform the functions described. In some embodiments, one or more of the commands of the primary level 305 may accept one or more of the arguments of the secondary level 310. For example, in some cases, a command may accept all arguments of the secondary level 310, while a different command may accept a single argument, or a subset of arguments of the secondary level 310. Similarly, in some embodiments, one or more of the arguments 310 may accept one or more attributes of the tertiary level 315, and one or more commands of the primary level 305 may accept one or more qualifiers 320. In some embodiments, some commands and arguments may optionally use, or in some examples altogether not accept, attributes of the tertiary level 315, qualifiers 320, or both attributes and qualifiers 320. As previously described with respect to FIG. 2, in further embodiments, the expanded command map 300 may include further levels of attributes (not depicted), in which an attribute may be an attribute of the tertiary level 315.

In various embodiments, the primary level 305 may include various additional shell commands adapted to an IoT environment. In various embodiments, a simulate command 321 may be provided in the IoT shell. The simulate command 321 may be configured to simulate an IoT resource, specified by an argument, such as the arguments of the secondary level 310, or the arguments of the secondary level 210 of the command map 200. The trace command 323 may be a traceroute command, configured to trace the route that data may take from an IoT device, running the IoT shell on which the trace command 323 is issued, to an IoT resource (or in some cases over an IoT resource, such as a connection) specified by the argument. The lock command 325 may cause an IoT resource, as specified by an argument, to be locked. Locking may include preventing access or modification of the IoT resource as specified by the argument. For example, in some embodiments, a locked device may require a user to enter a password or other form of authentication to gain access or modify the device. In some further embodiments, a locked device may be inaccessible until released. Accordingly, the release command 327 may cause a previously locked IoT resource, as indicated by the argument, to be released. Once released, a previously locked IoT resource may again become accessible. The debug command 329 may be cause an IoT resource, specified by the argument, to enter a debug mode. In some embodiments, the debug command 329 may further cause the IoT shell to enter a debug mode. In some embodiments, a debug mode for the IoT shell may include shell tracing functionality, wherein each command is printed, for example in a CLI, in the form that it is executed by the IoT shell. Accordingly, debug mode may allow a user to debug a script or other program being executed via the IoT shell. In yet further embodiments, the debug command 329 may cause an IoT resource to enter a respective debug mode, allowing the IoT resource to be debugged, via an IoT device running the IoT shell on which the debug command was executed. The configure command 331 may be executed to configure an IoT resource, as indicated by the argument, either locally or remotely via the IoT shell. In some embodiments, the deploy command 333 may be executed via the IoT shell to deploy services, software, or storage, network, and compute resources, remotely to an IoT resource. In other embodiments, the deploy command may be executed via the IoT shell to deploy an IoT resource, as indicated by the argument, itself. The revoke command 335 may be configured to revoke a previously deployed IoT resource, or alternatively, services, software, or storage, network, and compute resources deployed to an IoT resource. In some embodiments, the audit command 337 may cause the IoT shell to perform an audit of commands executed by the IoT shell. In other embodiments, the audit command 337 may be executed to perform an audit, remotely, of one or more IoT resources. The audit may include an audit of available IoT resources, and the use of IoT resources by one or more IoT devices, sensors, services, or connections. The ping command 339 may be configured to ping an IoT resource specified by the argument. Pinging may include, without limitation, requesting a response from a pinged device (e.g., IoT resource), and determining a latency to and from the IoT resource being pinged.

In various embodiments, the secondary level 310 may include various types of arguments, in addition to those previously described, to the commands. For example, in some embodiments, a link 341 argument may be provided. In some embodiments, the link 341 argument may indicate a link, such as a hard link or symbolic link, to a file, multiple files, directories, or a hyperlink to an IoT or other network-based resource. A data 343 argument may indicate one or more instances of data, a window of data, or a stream of data on which the shell command is to be performed. In various embodiments, the data referenced by the data 343 argument may include, without limitation, data stored on various IoT resources (e.g., storage devices, databased, network-based storage, etc.), or data generated by various IoT resources (e.g., sensors). A webservice 345 argument may indicate a specific network-based service with which the shell command may be performed. A host 347 argument may specify a host machine with which the shell command may be performed. For example, in some embodiments, the host machine may be configured to host one or more instances of IoT resources (e.g., virtual machines instances, services, and physical resources).

In various embodiments, the tertiary level 315 may include various attributes of the arguments of the secondary level 310. As previously described, each shell command may accept a respective set of one or more arguments. Similarly, each argument may be configured to accept a respective set of one or more attributes. In the following description, one or more attributes that may be accepted by a data 343 argument are depicted as hatched blocks for illustrative purposes. It is to be understood that the one or more attributes depicted as hatched blocks are not limited to or unique to the data 343 argument. In other embodiments, the attributes depicted as hatched blocks may further be applicable to other types of arguments, and attributes not depicted as hatched blocks may similarly be applicable to the data 343 argument. For example, the data 343 argument may be configured to accept various attributes, including split 349, ingest 351, stream 353, publish 355, and export 357. In some embodiments, the split 349 attribute may refer to a split instance of data, window of data, or data stream where the instance of data has been split into two or more instances. Alternatively, the split 349 attribute may reference whether an instance of data, window of data, or data stream to be split. For example, the shell command enable may be issued in combination with the data 343 argument with the split 349 attribute to enable splitting of the instance of data, window of data, or data stream. The ingest 351 attribute may reference whether an instance of data, window of data, or data stream may be ingested, or an ingested instance of data, window of data, or data stream. The stream 353 attribute may reference the ability of an instance of data, window of data, or a data stream to be streamed. In an alternative embodiment, where data is already being streamed, the stream 353 attribute may identify a specific data stream. Similarly, the publish 255 attribute may reference the ability of an instance of data, window of data, or a data stream to be published. The export 357 attribute may reference the ability of an instance of data, window of data, or a data stream to be exported. In further embodiments, the tertiary level 315 may further include an update 359 attribute. In some embodiments, the update 359 attribute may reference an ability of an argument to be updated. Alternatively, in some examples, the update 359 attribute may indicate whether an argument is an update, a type of update, an update version or number, or whether the argument identified should be used to update or should be updated.

In various embodiments, qualifiers 320 may be configured to modify a behavior of a shell command, argument, or attribute. As previously described, each shell command, argument, or attribute may accept a respective set of one or more qualifiers. In the following description, qualifiers 320 are depicted as hatched blocks for illustrative purposes, further modifying the data 343 argument. It is to be understood that in some embodiments, the one or more of the qualifiers 320 may not be limited to the data 343 argument or corresponding attributes depicted in hatched blocks. In other embodiments, the qualifiers depicted as hatched blocks may further be applicable to other types of arguments and attributes, while other qualifiers (not shown) may similarly be applicable to the data 343 argument and attributes depicted as hatched blocks. The JSON 361 qualifier may indicate that the data 343 argument should be formatted as JSON data, or reference data that has already been formatted as JSON data. Similarly, the XML 363 qualifier indicates data should be formatted as XML data, or reference data that has already been formatted as XML data. The raw 265 qualifier may indicate that data should be formatted as raw data, or reference raw data. For example, if a shell command is issued enabling a particular data stream, as indicated by the data qualifier 343 and stream attribute 353, the qualifier 320 may indicate the type of data stream to be enabled (e.g., a data stream of JSON, XML, or raw data.

Figure 4:
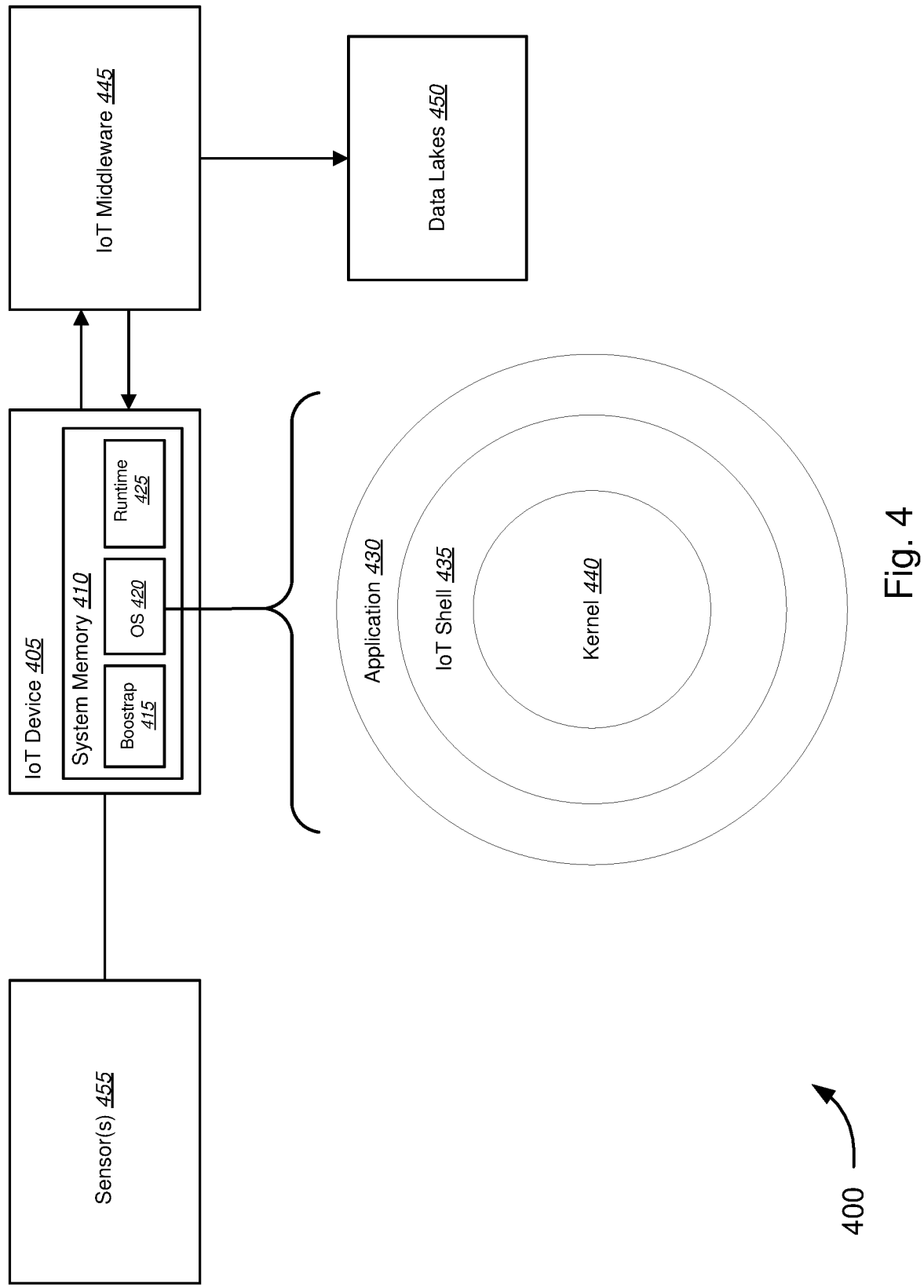
FIG. 4 is a schematic block diagram of a system for an IoT computing shell, in accordance with various embodiments.

FIG. 4 is a schematic block diagram of a system 400 for an IoT computing shell, in accordance with various embodiments. The system 400 may include an IoT device 405, IoT middleware 445, data lakes 450, and one or more sensors 455. The IoT device 405 may further include system memory 410 having bootstrap memory 415, OS 420, and runtime memory 425. The OS 420 may include a kernel 440, IoT shell 435, and application layer 430. It should be noted that the components of the system 400 are schematically illustrated in FIG. 4, and that a variety of hardware configurations are possible in accordance with various embodiments.

In various embodiments, the IoT device 405 may be coupled to an IoT middleware 445, and one or more sensors 455. The system 400 may be part of a larger IoT platform including various IoT resources, such as, without limitation, one or more additional IoT devices, sensors, services (not shown). In some embodiments, the one or more sensors 455 may include any variety of sensors. Sensors may include devices configured to detect or obtain information regarding about the surrounding physical environment. For example, sensors may include, without limitation, photodetectors, scales, gyroscopes, global positioning system (GPS) receiver, cameras, microphones, moisture readers, thermometers, smart-grid sensors, accelerometers, rangefinders, motion detectors, among many other types of sensors. The one or more sensors 455 may, in some embodiments, form at least part of a modular sensor ecosystem, in which sensors may be modularly added to, modified, replaced, and removed from one or more IoT devices, including IoT device 405, or one or more other sensors 455. For example, in some embodiments, the IoT device 405 may be configured to obtain data from sensors that may be coupled to a different IoT resource. Accordingly, in some embodiments, sensor data may be shared and collected by other IoT devices within the modular sensor ecosystem.

In various embodiments, data generated by the one or more sensors 455 may be obtained and/or stored by the IoT device 405, and further collected via an IoT middleware 445. In various embodiments, IoT middleware 445 may be configured to obtain data from one or more IoT devices, including IoT device 405, and build data lakes 450 from the obtained data. Accordingly, in some examples, the middleware 445 may be configured to build one or more data lakes 450. In other examples, the middleware 445 may transmit data collected from the one or more IoT devices to a different device for stream processing (and collection) into the one or more data lakes 450. In various embodiments, data streams may be generated by the various IoT resources, including without limitation various compute, network, and storage resources. For example, data streams may be generated by, without limitation, various devices and their sub-interfaces such as servers, physical machines and virtual machines, network devices, storage devices, IoT device 405, one or more sensors 455, and any associated telemetry instrumentation. Data streams may include real-time sensor data, health and performance metrics, and network metrics. In various embodiments, each data stream may be associated with a respective IoT device 405 and its sub-interfaces, or a respective sensor of the one or more sensors 455 and any associated sub-interfaces. Thus, as previously described, the plurality data streams may be collected by an IoT device 405, an application running on the application layer 430 of the IoT device 405, an IoT middleware 445, or other device that may be authorized and authenticated to access the data stream, via the IoT shell 435, of the IoT device 405.

In some embodiments, data streams from the one or more sensors 455, or one or more IoT devices, including IoT device 405, may be provided to the IoT middleware 445 and/or one or more data lakes 450. In some embodiments, the data stream may be generated continuously, periodically, or upon request. In some embodiments, the one or more data lakes 450 may be configured to contain data from one or more different IoT devices, such as IoT device 405. In other embodiments, the one or more data lakes 450 may be configured to include data from more than one IoT device. In yet further embodiments, the one or more data lakes may include data from a single sensor of the one or more sensors 455, while in other embodiments, the one or more data lakes 450 may include data from more than one of the one or more sensors 455. Accordingly, the one or more data lakes 450 may be collections of data from various IoT devices, including IoT device 405, and one or more sensors 455. The IoT middleware 445 may, thus, create or transmit data into one or more data lakes 450. The data lakes 450 may, in some further embodiments, be accessible by one or more respective interfaces and visualization tools. In some embodiments, the one or more data lakes 450 may include, without limitation, various types of search indices, relational databases, and the like. The data stream may then be accessed at the one or more data lakes 230, via various respective user interfaces and visualization tools by a user, analyst, a software tool, or service provider.

In various embodiments, the IoT middleware may include hardware, software, or both hardware and software, coupled to the IoT device 405. For example, in some embodiments, the IoT middleware 445 may be a program executable by the IoT device 405, via the IoT shell 435. Thus, the IoT middleware 445 may reside on the application layer 430, and be interpreted and/or executable via the IoT shell 435. In further embodiments, the IoT middleware 445 may be executed from a centralized location, such as a server or other IoT device, or in a distributed manner on one or more different IoT devices. The device or multiple devices running the IoT middleware may further be configured to run a respective instance of the IoT shell 435. In yet further embodiments, the IoT middleware 445 may include separate dedicated hardware, such as a hardware appliance, software, or both hardware and software. Accordingly, the IoT middleware 445 may be implemented as part of a field programmable gate array (FPGA), application specific integrated circuit (ASIC), system on a chip (SoC), microcontrollers, and other embedded solutions. Similarly, in various embodiments, IoT device 405 may include a computer system deployed within an IoT environment. For example, suitable types of computer systems may include single board computers, MCU systems (e.g., Arduino, Raspberry Pi, etc.), FPGAs, ASICs, and SoCs. The IoT device 405 may further include a processor (e.g., microcontrollers, such as an ARM controller), and system memory 410, which may include program instructions for the IoT shell 435. Accordingly, in various embodiments, the IoT device 405 may be configured to provide an IoT shell 435, which may interface with an application layer 430 on which programs, such as the IoT middleware 445, may pass instructions to be interpreted by the IoT shell 435. Accordingly, in various embodiments, the IoT shell 435 may allow the IoT middleware 445 to access resources of the kernel 440, as previously described.

Figure 5:
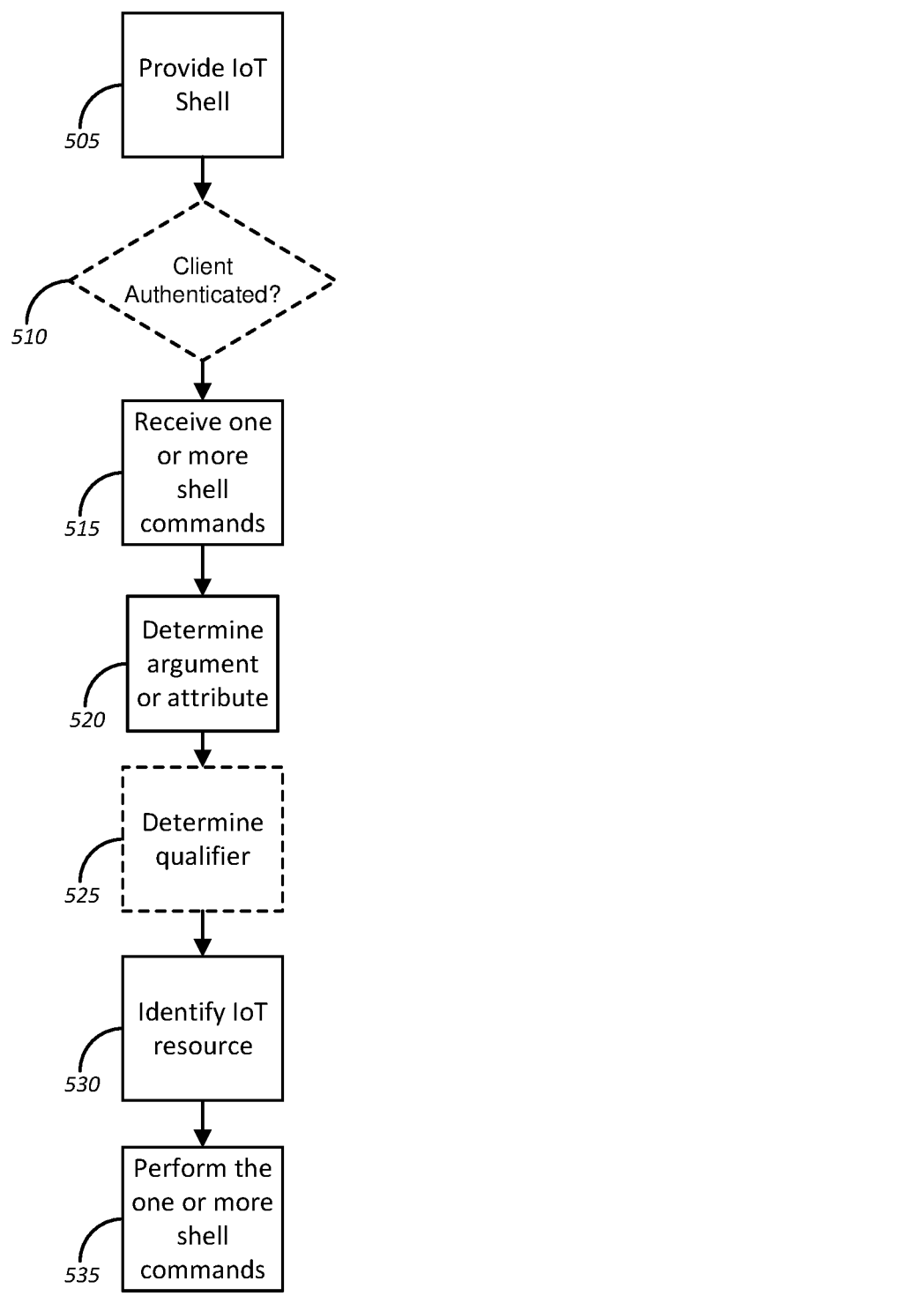
FIG. 5 is a flow diagram of a method of providing an IoT computing shell, in accordance with various embodiments.

FIG. 5 is a flow diagram of a method 500 of providing an IoT computing shell, in accordance with various embodiments. The method 500 begins, at block 505, by providing an IoT shell. As previously described, the IoT shell may be provided (e.g., executed) on an IoT device locally, or provided remotely on one or more other IoT devices, one or more servers, or a centralized management system. The IoT shell may comprise part of an operating system environment, providing an interface between the system kernel and an application layer. Thus, in various embodiments, the IoT shell may serve as an interface with the client for providing access to various IoT resources. This may include, without limitation, hardware resources of the underlying device (for example, an IoT device), or other IoT resources to which the underlying device is coupled (e.g., one or more sensors, data streams produced by the one or more sensors, web-based services, other IoT devices and/or sensors).

At optional decision block 510, the method 500 continues by determining whether the client has been authenticated. As previously described with respect to other embodiments, in some examples, the IoT shell may be configured to support an attribute-based encryption and authentication framework, wherein access and communication with an IoT device, one or more sensors, or other IoT resources may be restricted by the attribute-based encryption and authentication framework. For example, in some embodiments, shell commands and requests received from various IoT devices or connected IoT resources may be authenticated based on the attribute-based encryption and authentication framework. In further examples, the IoT shell may support an identity-based encryption and authentication. The client may include, for example, a local or remote user, program, middleware, or other software tool accessing the IoT shell via an application layer.

At block 515, the method 500 continues by receiving one or more shell commands, via the IoT shell. In various embodiments, the one or more shell commands may be received manually from a local or remote user, as issued through an interface, such as a CLI. In some embodiments, the one or more shell commands may be issued when a script is executed by the IoT shell. Thus, the script may include one or more shell commands to be executed. In some embodiments, the one or more shell commands may be issued as part of executing a program running on the application layer, for example an IoT middleware as previously described. This may include one or more program instructions that have been translated into or otherwise invoke shell commands. In some embodiments, shell commands may be issued manually, while in other embodiments, shell commands may be issued automatically in response to an input or condition.

At block 520, the method 500 continues by determining an argument and/or attribute along with the issued command. As previously described, in some embodiments, an argument may indicate what the shell command may act upon. This may include, without limitation, devices, sensors, peers, connections, entities, identifiers, and protocols. An attribute of an argument may further define further parameters of the argument, such as a number, parameter, format, field, etc.

At optional block 525, the method 500 continues by determining a qualifier of the shell command. In various embodiments, the qualifiers to the commands indicate how a function of a shell command is to be modified. For example, qualifiers may include, without limitation, an indication that the function of the shell should be continuous, periodic, specify an interval, quantity, set alerts, allow values, attributes, and parameters to be modified, and further qualify other behaviors of a shell command.

At block 530, the method 500 may continue by identifying respective IoT resources identified by the argument and attribute. At block 535, the method 500 may continue by performing the specified one or more shell commands to the respectively identified IoT resources. For example, this may include obtaining a data stream from one or more sensors identified by the argument and attributes, directly via a shell command issued to an IoT shell. Thus, in various embodiments, the IoT shell may be configured to provide functionality specific to an IoT environment, directly at the computing shell layer with the IoT shell. In turn, reliance on resource intensive middleware may be reduced, as the need to manage many disparate APIs, protocols, and software agents across a plurality of different IoT resources and platforms may be greatly reduced or eliminated.

Figure 6:
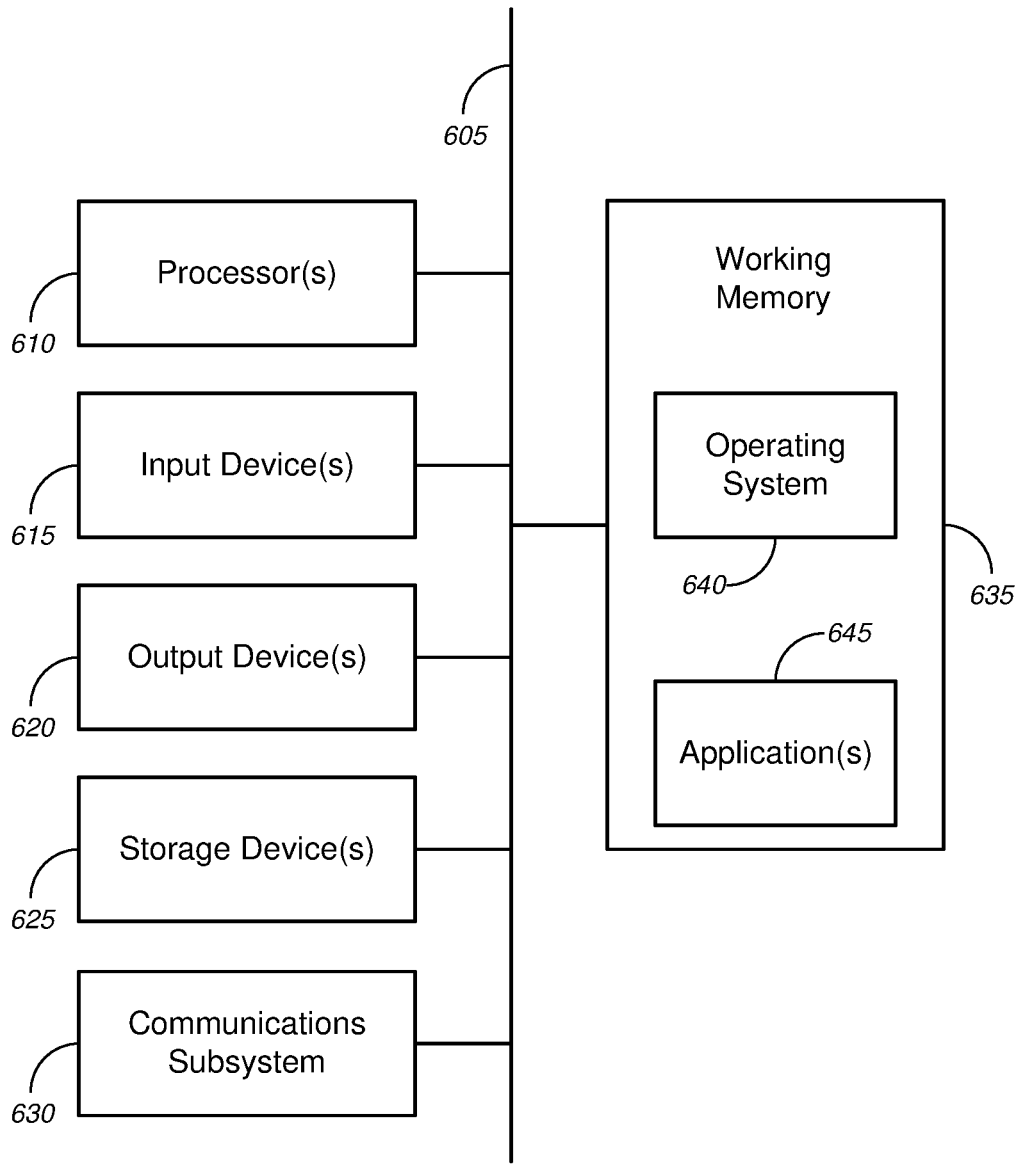
FIG. 6 is a schematic block diagram of a computer system for providing an IoT shell, in accordance with various embodiments.

FIG. 6 is a schematic block diagram of a computer system 600 for providing an IoT shell, in accordance with various embodiments. FIG. 6 provides a schematic illustration of one embodiment of a computer system 600, such as an IoT device, or a central (or distributed) management and/or monitoring system, which may perform the methods provided by various other embodiments, as described herein. It should be noted that FIG. 6 only provides a generalized illustration of various components, of which one or more (or none) of each may be utilized as appropriate. FIG. 6, therefore, broadly illustrates how individual system elements may be implemented in a relatively separated or relatively more integrated manner.

The computer system 600—which represents an embodiment of the IoT device as described above with respect to FIGS. 1-5—includes multiple hardware elements that may be electrically coupled via a bus 605 (or may otherwise be in communication, as appropriate). The hardware elements may include one or more processors 610, including, without limitation, one or more general-purpose processors and/or one or more special-purpose processors (such as microprocessors, digital signal processing chips, graphics acceleration processors, and microcontrollers); one or more input devices 615, which include, without limitation, a mouse, a keyboard, one or more sensors, and/or the like; and one or more output devices 620, which can include, without limitation, a display device, and/or the like.

The computer system 600 may further include (and/or be in communication with) one or more storage devices 625, which can comprise, without limitation, local and/or network accessible storage, and/or can include, without limitation, a disk drive, a drive array, an optical storage device, solid-state storage device such as a random-access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer system 600 might also include a communications subsystem 630, which may include, without limitation, a modem, a network card (wireless or wired), an IR communication device, a wireless communication device and/or chip set (such as a Bluetooth™ device, an 802.11 device, a WiFi device, a WiMax device, a WWAN device, a Z-Wave device, a ZigBee device, cellular communication facilities, etc.), and/or the like. The communications subsystem 630 may permit data to be exchanged with a network (such as the network described below, to name one example), with other computer or hardware systems, between data centers or different cloud platforms, and/or with any other devices described herein. In many embodiments, the computer system 600 further comprises a working memory 635, which can include a RAM or ROM device, as described above.

The computer system 600 also may comprise software elements, shown as being currently located within the working memory 635, including an operating system 640, which includes an IoT shell as previously described, device drivers, executable libraries, and/or other code, such as one or more application programs 645, which may comprise computer programs provided by various embodiments (including, without limitation, IoT middleware and other applications utilized by the IoT device to perform the processes described above), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 625 described above. In some cases, the storage medium might be incorporated within a computer system, such as the system 600. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer system 600 and/or might take the form of source and/or installable code, which, upon compilation and/or installation on the computer system 600 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, single board computers, FPGAs, ASICs, and SoCs) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer system 600) to perform methods in accordance with various embodiments of the invention. According to a set of embodiments, some or all of the procedures of such methods are performed by the computer system 600 in response to processor 610 executing one or more sequences of one or more instructions (which might be incorporated into the operating system 640 and/or other code, such as an application program 645) contained in the working memory 635. Such instructions may be read into the working memory 635 from another computer readable medium, such as one or more of the storage device(s) 625. Merely by way of example, execution of the sequences of instructions contained in the working memory 635 might cause the processor(s) 610 to perform one or more procedures of the methods described herein.

The terms "machine readable medium" and "computer readable medium," as used herein, refer to any medium that participates in providing data that causes a machine to operate in a specific fashion. In an embodiment implemented using the computer system 600, various computer readable media might be involved in providing instructions/code to processor(s) 610 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 625. Volatile media includes, without limitation, dynamic memory, such as the working memory 635. In some alternative embodiments, a computer readable medium may take the form of transmission media, which includes, without limitation, coaxial cables, copper wire and fiber optics, including the wires that comprise the bus 605, as well as the various components of the communication subsystem 630 (and/or the media by which the communications subsystem 630 provides communication with other devices). In an alternative set of embodiments, transmission media can also take the form of waves (including, without limitation, radio, acoustic, and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 610 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 600. These signals, which might be in the form of electromagnetic signals, acoustic signals, optical signals, and/or the like, are all examples of carrier waves on which instructions can be encoded, in accordance with various embodiments of the invention.

The communications subsystem 630 (and/or components thereof) generally receives the signals, and the bus 605 then might carry the signals (and/or the data, instructions, etc. carried by the signals) to the working memory 635, from which the processor(s) 610 retrieves and executes the instructions. The instructions received by the working memory 635 may optionally be stored on a storage device 625 either before or after execution by the processor(s) 610.

Figure 7:
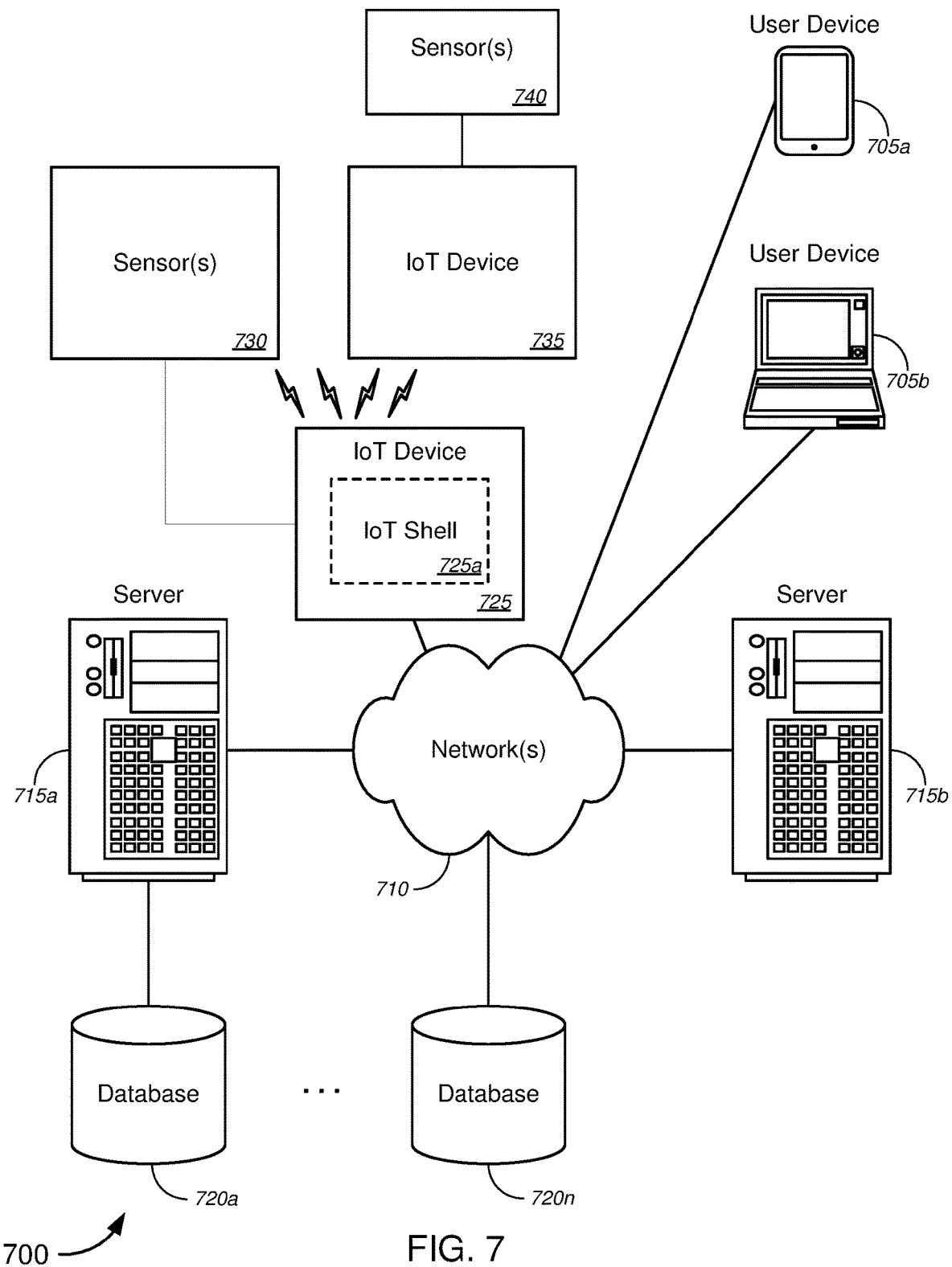
FIG. 7 is a block diagram illustrating a networked system of computing systems, IoT devices, and system hardware architecture, which may be used in accordance with various embodiments.

FIG. 7 is a block diagram illustrating a networked system 700 of computing systems, IoT devices, and system hardware architecture, which may be used in accordance with various embodiments. As noted above, a set of embodiments comprises methods and systems for providing an IoT shell for an IoT environment. The system 700 may include one or more user devices 705. A user device 705 may include, merely by way of example, desktop computers, single-board computers, tablet computers, laptop computers, handheld computers, and the like, running an appropriate operating system, which in various embodiments may include an IoT shell as previously described. User devices 705 may further include cloud computing devices, IoT devices, servers, and/or workstation computers running any of a variety of operating systems. In some embodiments, the operating systems may include commercially-available UNIX™ or UNIX-like operating systems. A user device 705 may also have any of a variety of applications, including one or more applications configured to perform methods provided by various embodiments (as described above, for example, an IoT middleware), as well as one or more office applications, database client and/or server applications, and/or web browser applications. Alternatively, a user device 705 may include any other electronic device, such as a thin-client computer, Internet-enabled mobile telephone, and/or personal digital assistant, capable of communicating via a network (e.g., the network(s) 710 described below) and/or of displaying and navigating web pages or other types of electronic documents. Although the exemplary system 700 is shown with two user devices 705, any number of user devices 705 may be supported.

Certain embodiments operate in a networked environment, which can include a network(s) 710. The network(s) 710 can be any type of network familiar to those skilled in the art that can support data communications using any of a variety of commercially-available (and/or free or proprietary) protocols, including, without limitation, MQTT, CoAP, AMQP, STOMP, DDS, SCADA, XMPP, custom middleware agents, Modbus, BACnet, NCTIP 1213, Bluetooth, Zigbee/Z-wave, TCP/IP, SNA™, IPX™, AppleTalk™, and the like. Merely by way of example, the network(s) 710 can each include a local area network ("LAN"), including, without limitation, a fiber network, an Ethernet network, a Token-Ring™ network and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, and/or the Internet.

Embodiments can also include one or more server computers 715. Each of the server computers 715 may be configured with an operating system, including, without limitation, any of those discussed above, as well as any commercially (or freely) available server operating systems. Each of the servers 715 may also be running one or more applications, which can be configured to provide services to one or more clients 705 and/or other servers 715.

Merely by way of example, one of the servers 715 might be a data server, a web server, a cloud computing device(s), or the like, as described above. The data server might include (or be in communication with) a web server, which can be used, merely by way of example, to process requests for web pages or other electronic documents from user computers 705. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 705 to perform methods of the invention.

The server computers 715, in some embodiments, might include one or more application servers, which can be configured with one or more applications, programs (such as an IoT middleware as previously described), web-based services, or other IoT resources accessible by a client (e.g., IoT shell) running on one or more of the user computers 705, IoT devices 725, 735, and/or other servers 715. Merely by way of example, the server(s) 715 can be one or more general purpose computers capable of executing programs or scripts in response to the user computers 705 and/or other servers 715, including, without limitation, web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including, without limitation, those commercially available from Oracle™, Microsoft™, Sybase™, IBM™, and the like, which can process requests from clients (including, depending on the configuration, dedicated database clients, API clients, web browsers, etc.) running on a user computer, user device, or customer device 705 and/or another server 715. In some embodiments, an application server can perform one or more of the processes for implementing media content streaming or playback, and, more particularly, to methods, systems, and apparatuses for implementing video tuning and wireless video communication using a single device in which these functionalities are integrated, as described in detail above. Data provided by an application server may be formatted as one or more web pages (comprising HTML, JavaScript, etc., for example) and/or may be forwarded to a user computer 705 via a web server (as described above, for example). Similarly, a web server might receive web page requests and/or input data from a user computer 705 and/or forward the web page requests and/or input data to an application server. In some cases, a web server may be integrated with an application server.

In accordance with further embodiments, one or more servers 715 can function as a file server and/or can include one or more of the files (e.g., application code, data files, etc.) necessary to implement various disclosed methods, incorporated by an application running on a user computer 705 and/or another server 715. Alternatively, as those skilled in the art will appreciate, a file server can include all necessary files, allowing such an application to be invoked remotely by a user computer, user device, or customer device 705 and/or server 715.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 720a-720n (collectively, "databases 720"). The location of each of the databases 720 is discretionary: merely by way of example, a database 720a might reside on a storage medium local to (and/or resident in) a server 715a (or alternatively, user device 705). Alternatively, a database 720n can be remote from any or all of the computers 705, 715, 725, 735 so long as it can be in communication (e.g., via the network 710) with one or more of these. In a particular set of embodiments, a database 720 can reside in a storage-area network ("SAN") familiar to those skilled in the art. (Likewise, any necessary files for performing the functions attributed to the computers 705, 715, 725, 735 can be stored locally on the respective computer and/or remotely, as appropriate.) In one set of embodiments, the database 720 may be a relational database configured to host one or more data lakes collected via one or more IoT devices 725, 735. Relational databases may include, for example, an Oracle database, that is adapted to store, update, and retrieve data in response to SQL-formatted commands. The database might be controlled and/or maintained by a database server, as described above, for example.

The system 700 might further include one or more IoT devices 725, 735. In various embodiments, the IoT devices 725, 735 may be communicatively coupled to each other directly, or alternatively via network(s) 710. An IoT device 725, 735, like the user device 705, may include, without limitation, desktop computers, tablet computers, laptop computers, handheld computers, single-board computers and the like, running an appropriate operating system, which in various embodiments may include an IoT shell 725a as previously described. IoT devices 725, 735 may further include cloud computing devices, servers, and/or workstation computers running any of a variety of operating systems. In some embodiments, the operating systems may include commercially-available UNIX™ or UNIX-like operating systems. Either or both of the IoT devices 725, 735 may also have any of a variety of applications, including one or more applications configured to perform methods provided by various embodiments (as described above, for example, an IoT middleware), as well as one or more office applications, database client and/or server applications, and/or web browser applications. Although the exemplary system 700 is shown with two IoT devices 725, 735, any number of user IoT devices may be supported.

Each of the IoT device 725, 735 may further be coupled, respectively, to one or more sensors 730, 740. The one or more sensors 730, 740 may include various types of sensors, including, without limitation, photodetectors, scales, gyroscopes, global positioning system (GPS) receiver, cameras, microphones, moisture readers, thermometers, smart-grid sensors, accelerometers, rangefinders, motion detectors, among many other types of sensors. In some embodiments, the one or more sensors 730, 740 may be accessible by other device, via network(s) 710. For example, a user device 705 may access data generated by either of the one or more sensors 730, 740, via the network 710. In some embodiments, an IoT device 725, 735 may be configured to transmit data from the one or more sensors 730, 740 to a requesting device, such as the user device 705. In yet further embodiments, the IoT devices (725, 735) may be configured to transmit data streams from the one or more sensors 730, 740 to a data lake, which, for example, may be hosted on databases 720.

These and other functions of the system 700 (and its components) are described in greater detail above with respect to FIGS. 1-5.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to certain structural and/or functional components for ease of description, methods provided by various embodiments are not limited to any single structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in sequentially for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a specific structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to one embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A system comprising:
a plurality of Internet of things (IoT) resources including one or more sensors;
a data lake comprising a collection of data streams from the one or more sensors;
an IoT device in communication with the plurality of IoT resources and coupled to the one or more sensors, wherein at least one first sensor of the one or more sensors is located in a second device different from the IoT device and at least one second sensor of the one or more sensors is located in a third device different from the IoT device and the second device, the IoT device comprising:
a processor;
a non-transitory computer readable medium comprising instructions executable by the processor to:
provide an IoT shell interfacing with a first system kernel located in the second device and a second system kernel located in the third device, the IoT shell configured to accept a set of one or more shell commands;
provide, via the IoT shell, a command line interface configured to allow input of one or more shell commands;
receive, via the command line interface, one or more shell commands;
determine, via the IoT shell, for each of the one or more shell commands, at least one of an argument of the shell command, and an attribute of the argument;
receive, via the IoT shell, a shell command of the one or more shell commands to obtain at least one data stream of the collection of data streams from the at least one first sensor and the at least one second sensor, wherein the shell command is configured to convert the one or more shell commands into a first respective kernel function associated with the second device and a second respective kernel function associated with the third device to be invoked by the IoT shell via the first system kernel located in the second device and the second system kernel located in the third device;
send the first respective kernel function, via the IoT shell, to the first kernel system of the second device;
send the second respective kernel function, via the IoT shell, to the second kernel system of the third device; and
obtain, from the first system kernel and the second system kernel by the IoT shell, the at least one data stream from the at least one first sensor and the at least one second sensor of the one or more sensors based on the first respective kernel function and the second respective kernel function.

2. The system of claim 1, wherein the instructions are further executable by the processor to:
determine, via the IoT shell, for at least one shell command, a qualifier; and
modify a behavior of the at least one shell command, based on the qualifier.

3. The system of claim 1, wherein the IoT device is further in communication with an IoT middleware, wherein the IoT middleware is configured to issue the one or more shell commands to the IoT shell.

4. The system of claim 1, wherein the plurality of IoT resources includes kernel resources of the IoT device, hardware resources of the IoT device, one or more sensors coupled to the IoT device, services accessible by the IoT device, and connections to and from the IoT device.

5. The system of claim 1, wherein the plurality of IoT resources includes hardware resources of other IoT devices, one or more sensors coupled to other IoT devices, services accessible by other IoT devices, and connections to and from other IoT devices.

6. The system of claim 1, wherein the instructions are further executable by the processor to:
receive, via the IoT shell, a shell command of the one or more shell commands to provision at least one IoT resource; and
provision, via the IoT shell, a new IoT resource responsive to a shell command issued to the IoT shell, wherein provisioning via the IoT shells includes at least one of firmware validation, configuration based on pre-defined profiles, and configuration based on a cloud reference.

7. The system of claim 1, wherein the instructions are further executable by the processor to:
provide, via the IoT shell, an attribute-based encryption and authentication framework, wherein access to the one or more sensors is restricted by the attribute-based encryption and authentication framework.

8. The system of claim 1, wherein the instructions are further executable by the processor to:
provide, via the IoT shell, offline data storage; and
batch process, via the IoT shell, data from the one or more sensors.

9. The system of claim 1, wherein the instructions are further executable by the processor to:
access, via the IoT shell, libraries associated with a programming language, wherein the IoT device is configured to receive commands in the programming language; and
translate, via the IoT shell, commands in the programming language to one or more shell commands.

10. An apparatus comprising:
a processor;
a non-transitory computer readable medium comprising instructions executable by the processor to:
provide an IoT shell in an IoT device interfacing with a first system kernel located in a second device and a second system kernel located in a third device, the IoT shell configured to accept a set of one or more shell commands, wherein the second device is different from the IoT device and the third device is different from the IoT device and the second device;
provide, via the IoT shell, access to one or more IoT resources responsive to one or more shell commands;
provide, via the IoT shell, a command line interface configured to allow input of one or more shell commands;
receive, via the command line interface, one or more shell commands from an application layer;
determine, via the IoT shell, for each of the one or more shell commands, at least one of an argument of the shell command, and an attribute of the argument;
receive, via the IoT shell, a shell command of the one or more shell commands to obtain data from at least one first sensor and at least one second sensor of one or more sensors of the plurality of IoT resources, wherein the at least one first sensor of the one or more sensors is located in the second device and the at least one second sensor is located in the third device, wherein the shell command is configured to convert the one or more shell commands into a first respective kernel function associated with the second device and a second respective kernel function associated with the third device to be invoked by the IoT shell via the first system kernel located in the second device and the second system kernel located in the third device;
send the first respective kernel function, via the IoT shell, to the first kernel system of the second device;
send the second respective kernel function, via the IoT shell, to the second kernel system of the third device; and
obtain, from the first system kernel and the second system kernel by the IoT shell, the data from the at least one first sensor and the at least one second sensor of the one or more sensors based on the first respective kernel function and the second respective kernel function.

11. The apparatus of claim 10, wherein the instructions are further executable by the processor to:
determine, via the IoT shell, for at least one shell command, a qualifier; and
modify a behavior of the at least one shell command, based on the qualifier.

12. The apparatus of claim 10, wherein the instructions are further executable by the processor to:
receive, at the IoT shell, the one or more shell commands from an IoT middleware, wherein the IoT middleware is configured to issue the one or more shell commands to the IoT shell.

13. The apparatus of claim 10, wherein the instructions are further executable by the processor to:
receive, via the IoT shell, a shell command of the one or more shell commands to provision at least one IoT resource; and
provision, via the IoT shell, a new IoT resource responsive to a shell command issued to the IoT shell, wherein provisioning via the IoT shells includes at least one of firmware validation, configuration based on pre-defined profiles, and configuration based on a cloud reference.

14. The apparatus of claim 10, wherein the instructions are further executable by the processor to:
provide, via the IoT shell, an attribute-based encryption and authentication framework, wherein access to the one or more sensors is restricted by the attribute-based encryption and authentication framework.

15. A method comprising:
providing, at an IoT device, an IoT shell interfacing with a first system kernel located in a second device and a second system kernel located in a third device, the IoT shell configured to accept a set of one or more shell commands, wherein the second device is different from the IoT device and the third device is different from the IoT device and the second device;
providing, via the IoT shell, access to one or more IoT resources responsive to one or more shell commands;
providing, via the IoT shell, a command line interface configured to allow input of one or more shell commands;
receiving, via the command line interface, one or more shell commands;
determining, via the IoT shell, for each of the one or more shell commands, at least one of an argument of the shell command, and an attribute of the argument;
receiving, via the IoT shell, a shell command of the one or more shell commands to obtain at least one data stream of the collection of data streams from at least one first sensor and at least one second sensor of the one or more sensors, wherein the at least one first sensor of the one or more sensors is located in the second device and the at least one second sensor is located in the third device, wherein the shell command is configured to convert the one or more shell commands into a first respective kernel function associated with the second device and a second respective kernel function associated with the third device to be invoked by the IoT shell via the first system kernel located in the second device and the second system kernel located in the third device;
sending the first respective kernel function, via the IoT shell, to the first kernel system of the second device;
sending the second respective kernel function, via the IoT shell, to the second kernel system of the third device; and
obtaining, from the first system kernel and the second system kernel by the IoT shell, the at least one data stream from the at least one first sensor and the at least one second sensor of the one or more sensors based on the first respective kernel function and the second respective kernel function.

16. The method of claim 15, further comprising:

determining, via the IoT shell, for at least one shell command, a qualifier; and modifying a behavior of the at least one shell command, based on the qualifier.

17. The method of claim 15, further comprising:

authenticating, via the IoT shell, a user or program issuing the one or more shell commands based on an attribute-based encryption and authentication framework.

* * * * *